United States Patent
Modin

(10) Patent No.: US 9,604,417 B2
(45) Date of Patent: Mar. 28, 2017

(54) METHOD FOR MAKING CONTOURED COMPOSITE STIFFENERS

(75) Inventor: Andrew E. Modin, Enumclaw, WA (US)

(73) Assignee: THE BOEING COMPANY, Chicago, IL (US)

( * ) Notice: Subject to any disclaimer, the term of this patent is extended or adjusted under 35 U.S.C. 154(b) by 892 days.

(21) Appl. No.: 13/079,945

(22) Filed: Apr. 5, 2011

(65) Prior Publication Data

US 2012/0258276 A1   Oct. 11, 2012

(51) Int. Cl.
| | | |
|---|---|---|
| *B29C 70/44* | (2006.01) | |
| *B32B 7/00* | (2006.01) | |
| *B32B 37/00* | (2006.01) | |
| *B32B 37/02* | (2006.01) | |
| *B29C 70/54* | (2006.01) | |
| *B29C 70/48* | (2006.01) | |
| *B29C 70/34* | (2006.01) | |
| *B29D 99/00* | (2010.01) | |
| *F01D 5/28* | (2006.01) | |

(52) U.S. Cl.
CPC ........ *B29C 70/543* (2013.01); *B29C 70/342* (2013.01); *B29C 70/443* (2013.01); *B29C 70/48* (2013.01); *B29C 70/541* (2013.01); *B29D 99/0003* (2013.01); *B29D 99/0025* (2013.01); *F01D 5/282* (2013.01); *Y10T 156/1044* (2015.01); *Y10T 428/24* (2015.01)

(58) Field of Classification Search
CPC .................................................. B29C 70/541
See application file for complete search history.

(56) References Cited

U.S. PATENT DOCUMENTS

| | | | |
|---|---|---|---|
| 3,259,021 A | 7/1966 | Appleton et al. | |
| 4,707,214 A | 11/1987 | Nithart et al. | |
| 4,726,924 A | 2/1988 | Mittelstadt | |
| 4,867,834 A | 9/1989 | Alenskis et al. | |
| 6,630,095 B2 | 10/2003 | Slaughter et al. | |
| 7,134,629 B2 | 11/2006 | Johnson et al. | |
| 7,469,735 B2 | 12/2008 | Brown et al. | |
| 7,622,066 B2 | 11/2009 | Brustad et al. | |
| 2006/0017200 A1 | 1/2006 | Cundiff et al. | |
| 2007/0176323 A1* | 8/2007 | Jones | B29C 70/44 264/258 |
| 2009/0261199 A1 | 10/2009 | McCarville et al. | |
| 2010/0285265 A1* | 11/2010 | Shinoda et al. | 428/80 |
| 2011/0259508 A1* | 10/2011 | Inserra Imparato et al. | 156/182 |

FOREIGN PATENT DOCUMENTS

| | | |
|---|---|---|
| JP | 2002172630 A | 6/2002 |
| JP | 2004130723 A | 4/2004 |

(Continued)

OTHER PUBLICATIONS

European Search Report, dated Jul. 18, 2012, regarding Application No. EP12161459, 6 pages.

(Continued)

*Primary Examiner* — Benjamin Schiffman
(74) *Attorney, Agent, or Firm* — Yee & Associates, P.C.

(57) ABSTRACT

A contoured composite part is made by assembling a preform charge, including aligning a plurality of plies along a preselected contour. The assembled aligned preform charge is then placed in a forming tool, where the charge is formed and cured.

1 Claim, 12 Drawing Sheets

(56) References Cited

FOREIGN PATENT DOCUMENTS

| JP | 2005047131 A | 2/2005 |
|---|---|---|
| JP | 2011507738 A | 3/2011 |
| WO | WO 2009088029 A1 * | 7/2009 |

OTHER PUBLICATIONS

Office Action, dated Nov. 19, 2014, regarding U.S. Appl. No. 13/975,342, 12 pages.
Notice of Allowance, dated Feb. 20, 2015, regarding U.S. Appl. No. 13/975,342, 5 pages.
Notice of Reasons for Rejection and English Translation, regarding Japanese Patent Application No. 2012-079705, Issued Jan. 12, 2016, 4 pages.

* cited by examiner

METHOD FOR MAKING CONTOURED COMPOSITE STIFFENERS

TECHNICAL FIELD

This disclosure generally relates to the fabrication of composite parts, and deals more particularly with a method and apparatus for making contoured composite stiffeners.

BACKGROUND

Composite structural members such as stiffeners may be used in a variety of applications to increase the strength and/or rigidity of assemblies. For example, in the aircraft industry, structural stiffeners such as stringers may be used to strengthen a fuselage. The stringers may be contoured along their length in order to conform to curvatures in the fuselage. In some areas of the fuselage, the stringers may have compound contours along their lengths.

Composite stringers having compound contours of the type described above may be fabricated by laying up multiple plies of composite pre-preg over a tool having compound contours substantially matching those of the finished part. The layup may be formed to shape and cured using vacuum bag and autoclave processing. Fabrication techniques using pre-preg may have disadvantages in some applications. For example, in order to achieve the desired stringer contours, one or more of the pre-preg plies may require cutting, darting and/or splicing, which may add weight to the fuselage and/or cost.

Other techniques may be used to fabricate contoured stringers, such as resin infusion of dry fiber preforms. However, resin infusion may require the use of closed molds which need preparation and later cleanup after the part has been molded to shape. Moreover, alignment of the preform with resin distribution media and permeable parting films may be difficult without the use of stitching and/or tackifiers. Also, it may be difficult to control fiber angles in fiber preforms using known resin infusion techniques. Variations in fiber angles may result in undesired performance characteristics in the finished part.

Accordingly, there is a need for a method and apparatus for fabricating composite structural members having compound contours that reduce tool handling and which facilitate alignment of composite charges to better match tool contours. There is also a need for a method and apparatus as described above which may substantially eliminate the need for clean up of tooling following part molding, and which may be adapted for resin infusion processing using open molds.

SUMMARY

The disclosed embodiments provide a method and apparatus for fabricating composite structural members, such as stringers, having compound contours. The use of contour preform braiding with open bagged tooling provides uniform cure pressure for resin infusion curing to produce cured stringers with continuous fibers. In one embodiment, dual vacuum bags are used to provide pressure across the flanges of a stringer, and enabling them to be held in intimate contact with the mold surface while reducing the chance of bag leaks. Near net molding of stringers may be achieved without the need for stitching, tackifiers and tool handling. The use of an alignment tool for pre-aligning components of a preform fiber charge reduces the need for handling the preform, which may result in improved control over fiber angle and/or thickness of the finished part. The use of fiber preforms that are braided, including biaxial and triaxial braids, may allow the preform to better conform to and accommodate different and changing three dimensional contours and radii during layup.

The apparatus includes a preform charge assembly tool and a preform forming tool. A contoured, braided preform is assembled in the assembly tool with resin distribution media and permeable parting films. The assembly tool sets the desired contour with changing radii for the desired part. The assembled and pre-aligned preform charge is transferred from the assembly tool into an envelope vacuum bag held in a forming tool where a bladder-actuated mandrel clamps a web or blade portion of the preform, following which one or more flanges of the preform are folded to form stringer flanges. A radius filler and cap plies are added, as desired, the envelope vacuum bag is sealed, and a second vacuum bag is installed. The charge is then infused with resin. Following resin infusion and curing, the part is removed from the open mold and trimmed to the desired cross section and lengths.

In accordance with one disclosed embodiment, a method is provided of making a contoured composite part. The method comprises assembling a charge, including aligning a plurality of plies along a preselected contour and transferring aligned charge to a forming tool. The method further comprises forming the charge in the forming tool and curing the formed charge. Assembling the charge may include placing at least one fiber preform on an assembly tool, and aligning the plies may include using the assembly tool to align the fiber preform along the preselected contour. After being assembled on the assembly tool, a portion of the charge is clamped following which an unclamped portion of the charge is then inserted into the forming tool. The method may further comprise infusing the fiber preform with resin after the aligned charge has been transferred to the forming tool. The method may also comprise placing a first vacuum bag over the forming tool before the aligned charge is transferred to the forming tool, placing a second vacuum bag over at least a portion of the fiber preform contained within the first vacuum bag, and infusing the fiber preform with resin introduced into the first vacuum bag. The method may further comprise maintaining the alignment of the plies in the charge by clamping the plies together while in the assembly tool and keeping them clamped until they have been clamped in the forming tool.

According to another disclosed embodiment, a method is provided of making a composite structural member having a web and at least one flange. The method comprises assembling a multi-ply charge having at least one fiber reinforcement and clamping a first web portion of the charge in a tool. The method further comprises forming a second flange portion of the charge while the first web portion is clamped in the tool, and curing the formed charge. Assembling the charge may include aligning the plies relative to each other along a preselected contour, and clamping the aligned plies together.

According to a further embodiment, apparatus is provided for making a composite structural member having at least one contour. The apparatus comprises an assembly tool for assembling a plurality of plies forming a charge, and a forming tool for forming the structural member. The assembly tool includes a contoured alignment guide for aligning the plies along a contour and a clamping mechanism for clamping the pre-aligned plies together. The forming tool includes a pair of relatively moveable mandrels between which the assembled charge may be clamped. The forming tool includes a base, wherein the mandrels are relatively movable on the base toward and away from each other to clamp the charge therebetween. The mandrels include tool surfaces over which at least a portion of the clamped charge may be formed. The forming tool may further include an inflatable bladder for applying clamping pressure to one of the mandrels. The apparatus may also comprise the first vacuum bag covering the forming tool, and a second vacuum bag adapted to cover the formed charge, the web of which is clamped on the forming tool. Each of the mandrels includes a contoured clamping surface for forming a contour into the charge.

According to still another embodiment, apparatus is provided for making a composite member having a web with a compound contour and at least one flange. The apparatus comprises an assembly tool for assembling pre-aligning a charge along a first contour, and a forming tool. The forming tool includes a base and a pair of contoured mandrels on the base between which a web portion of the charge may be clamped and formed along the second contour. At least one of the mandrels includes a tool surface onto which a flange portion of the clamped charge may be formed.

BRIEF DESCRIPTION OF THE ILLUSTRATIONS

DETAILED DESCRIPTION

Figure 1:
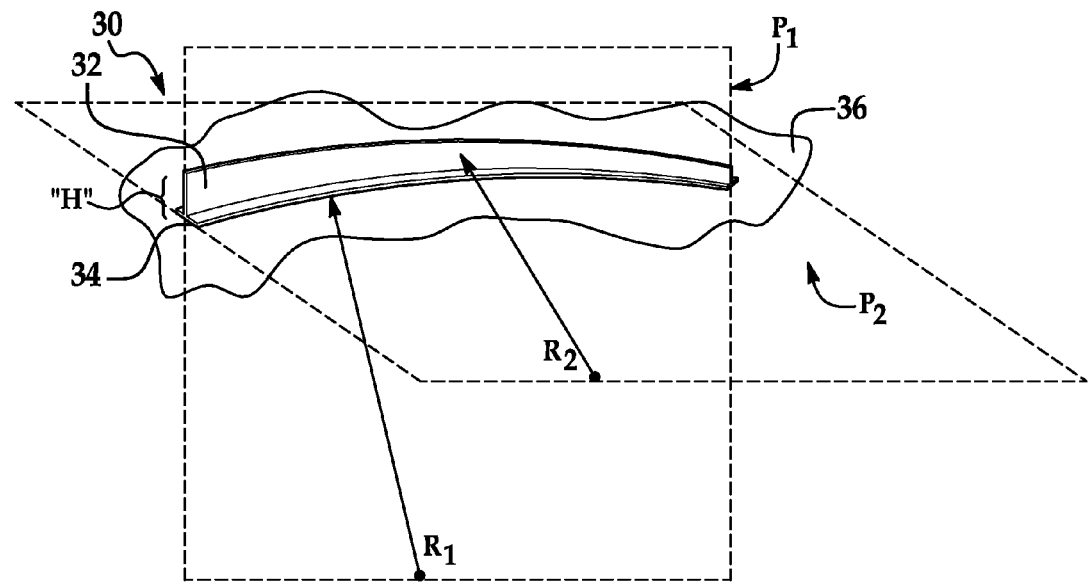
FIG. 1 is an illustration of a perspective view of a composite stringer having compound contours.

Referring first to FIG. 1, the disclosed embodiments broadly relate to a method and apparatus for making a curved composite part, such as, for example and without limitation, a compound contoured composite stringer 30. In the illustrated embodiment, the stringer 30 is contoured according to radii $R_1$, $R_2$, which respectively oriented in orthogonal planes $P_1$, $P_2$ however other contouring geometries are possible, and the stringer 30 may be contoured, or partially contoured along only a portion of its length. In other embodiments, the stringer 30 may have only a single contour along its length. In the illustrated embodiment shown in FIG. 1, $R_1$ and $R_2$ form planar arcs that are substantially constant, however $R_1$, and/or $R_2$ may be vary axially and or laterally such that the stringer 30 includes one or more twists along its length. The stringer 30, sometimes referred to as a "blade stringer", includes a web portion 32 and a flange portion 34 which may be joined by any suitable means to a contoured skin 36. The web portion 32, sometimes also referred herein as a "blade", has a height "H". While a blade stringer 30 is illustrated in the exemplary embodiment, the disclosed method and apparatus may be employed to fabricate a variety of other elongate structural members having one or more contours along their length. Also, the disclosed method and apparatus may be employed to fabricate elongate structural members having any of a variety of cross sectional shapes, including without limitation, "C", "J", and "I" shapes, to name only a few.

Figure 2:
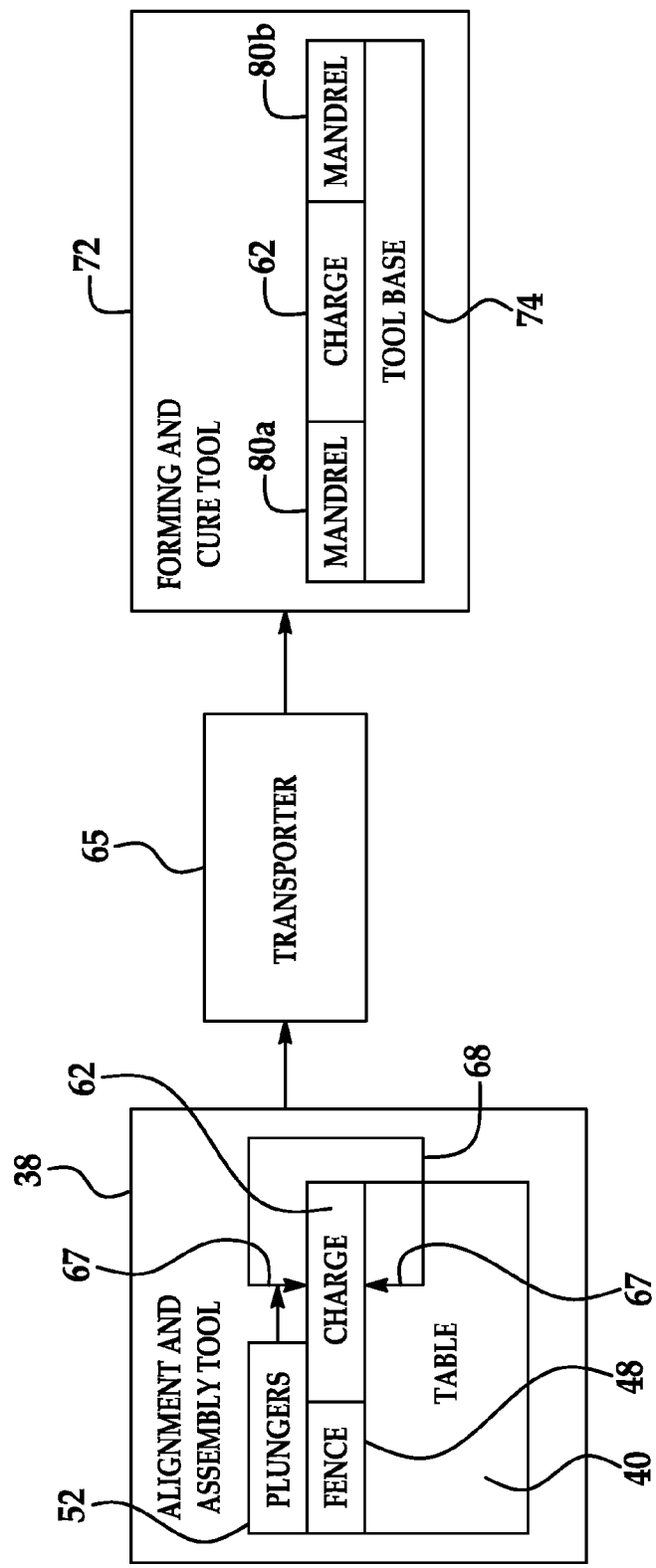
FIG. 2 is a functional block diagram of apparatus for fabricating the stringer shown in FIG. 1.

FIG. 2 illustrates the primary components of the apparatus for fabricating a composite part such as the stringer 30 shown in FIG. 1. The apparatus broadly comprises an alignment and assembly tool 38 (hereinafter referred to as an assembly tool 38, for simplicity of description), and a forming and cure tool 72 (hereinafter referred to as a forming tool 72, also for simplicity of description). The assembly tool 38 includes a table 40 for supporting the charge 62, and a curved fence 48 on the table 40 that is used to align the components 54, 56, 58, (see FIG. 12) of the charge 62. Once aligned, the components 54, 56, 58, 60 (FIG. 12) of the charge 62 are held between the jaws 67 of a plurality of clamps 68. The positions of the clamps 68 on the charge 62 determine the blade height "H" of the stringer 30 shown in FIG. 1 and are by the amount of extension of plungers 52 which engage at least one of the jaws 67 of the clamps 68.

After the charge 62 has been clamped by the clamps 68, a suitable transporter 65 such as a robot (not shown) may be used to transport the clamped charge 62 to the forming tool 72. The forming tool 72 broadly comprises a pair of mandrels 80a, 80b slideable on a tool base 74. The charge 62 is held between the mandrels 80a, 80b during the forming process, described in more detail below, while the charge is formed onto the mandrel 80a, 80b.

Figure 3:
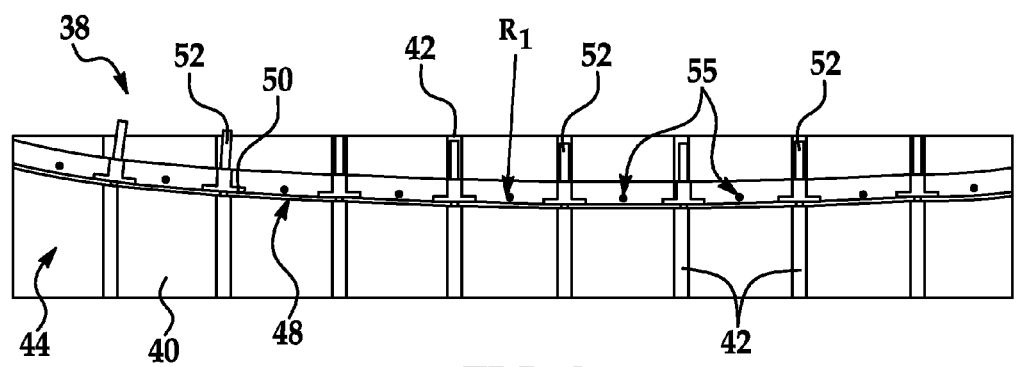
FIG. 3 is an illustration of a plan view of an assembly tool for assembling a composite charge used to make the stringer shown in FIG. 1.
Figure 4:
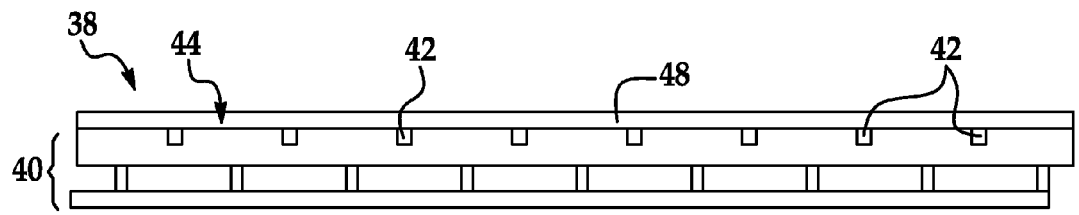
FIG. 4 is an illustration of a side view of the assembly tool shown in FIG. 3.

FIGS. 3-12 illustrates additional details of the assembly tool 38 as well as sequential steps for aligning and assembling the components 54, 56, 58, 60 (FIG. 12) the charge 62. Referring particularly to FIGS. 3 and 4, the assembly tool 38 comprises a vacuum table 40 having a substantially flat charge supporting surface 44, which includes a plurality of generally parallel, transversely extending slots 42. A plurality of double acting cylinders are mounted on the table 40 and respectively include axially extendable, elongate plungers 52 disposed above the vacuum table surface 44 which act as blade depth spacers. In other embodiments (not shown), plungers 52 may be provided both above and below the table surface 44. The cylinders 50 may be air/gas, hydraulically or electrically actuated. An alignment fence 48 having a desired contour or changing radius $R_1$ substantially corresponding to the radius $R_1$ shown in FIG. 1, is secured to the table surface 44 by fasteners 55. In other embodiments, the contour $R_1$ of the fence 48 may be changeable though the use of numeric control devices, pins, etc.

As will be discussed below in more detail, the assembly tool 38 functions to pre-align the components 54, 56, 58, 60 (FIG. 12) of a charge 62 (FIG. 2), sometimes also referred to herein as a fiber preform assembly, such that the components 54, 56, 58, 60 of the charge 62 are aligned relative to each other, and are also aligned along the contour $R_1$ of the alignment fence 48. As used herein, the term "charge" is intended to include both fiber preforms or parts that may be dry or partially infused, and prepregs. In the illustrated embodiments discussed below, the charge 62 comprises a dry fiber preform 58 (FIG. 7), however, principals of the disclosed method and apparatus may be employed to fabricate composites structures using prepregs.

Figure 5:
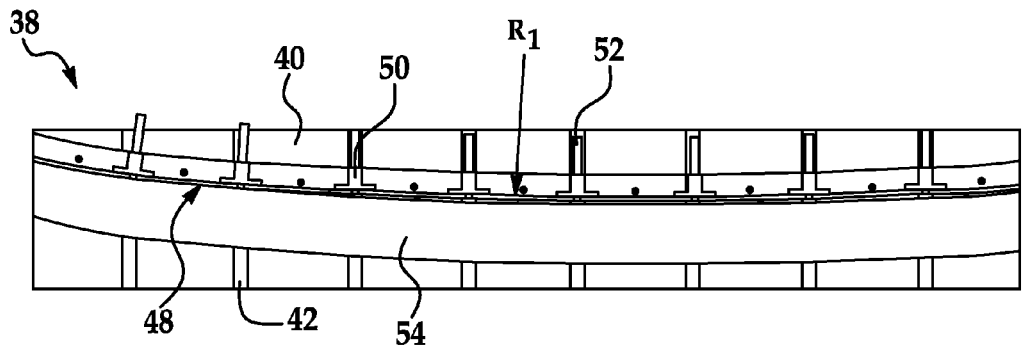
FIG. 5 is an illustration similar to FIG. 3 showing resin distribution media having been placed on the assembly tool.

Referring to FIG. 5, in use, a charge 62 (FIG. 2) is stacked up by first placing a resin distribution media on the table surface 44, aligned along the contoured fence 48. Next, as shown in FIG. 6, a ply of a permeable parting film 56 is placed on the distribution media 54, also aligned along the contour of the fence 48.

Figure 6:
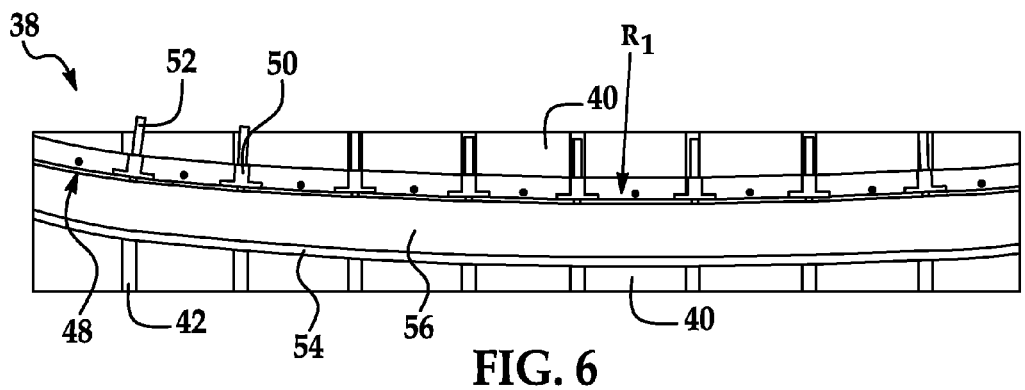
FIG. 6 is an illustration similar to FIG. 5 showing a permeable parting film having been placed over the resin distribution media.
Figure 7:
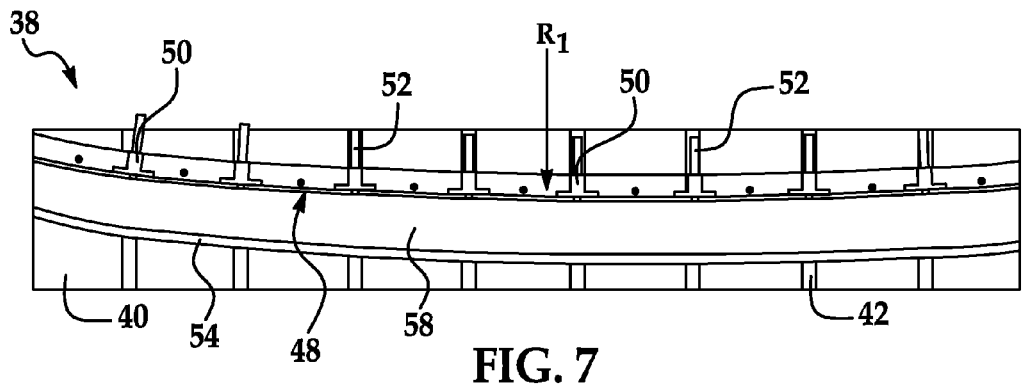
FIG. 7 is an illustration similar to FIG. 6 showing a braided fiber preform having been placed over the permeable parting film.
Figure 8:
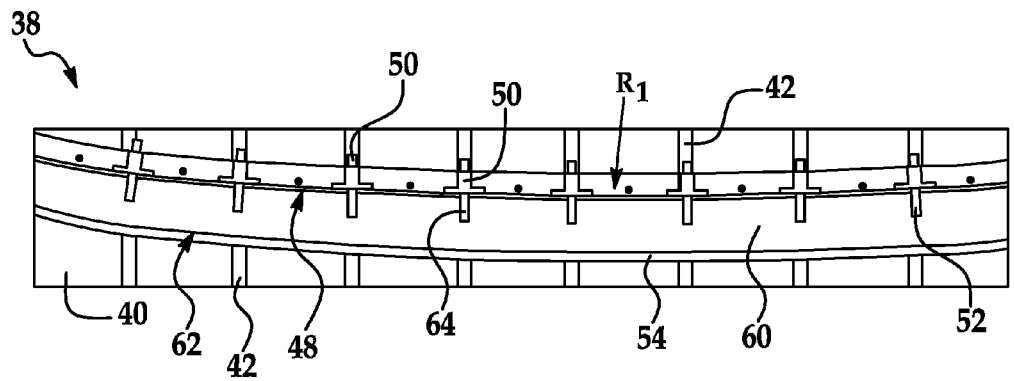
FIG. 8 is a view similar to FIG. 7 but showing another permeable parting film having been placed over the fiber preform, and blade height spacers having been actuated.

Referring to FIG. 7, next, a fiber preform 58 which may comprise one or more tubular or sock-like braided fiber preform 58a, 58b (see FIG. 16), is placed over the permeable parting film 56 shown in FIG. 6, also aligned along the contoured fence 48. Then, as shown in FIG. 8, a second ply of a permeable parting film 60 is placed on the fiber preform 58 and is aligned along the fence 48, thereby forming a complete charge or preform assembly 62 comprising two plies of permeable parting film 56, 60, resin distribution media 54 and the braided fiber preform 58 (see FIG. 12). The use of a braided fiber preform 58 may allow automated fabrication of an engineered preform that allows compound curvature of the stringer 30 and facilitates layup. The braided fiber preform 58 may comprise crimped or non-crimped fibers, and may comprise a biaxial braid of three of more fibers or a triaxial braid in order to provide the stringer 30 (FIG. 1) with additional strength. Also, fiber preforms fabricated by processes other than braiding may be possible.

Figure 9:
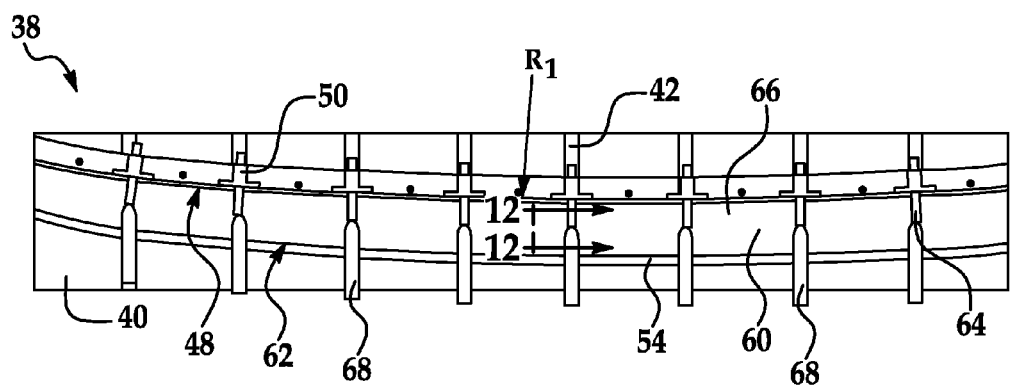
FIG. 9 is an illustration similar to FIG. 8 but showing the preform charge clamps having been installed.
Figure 12:
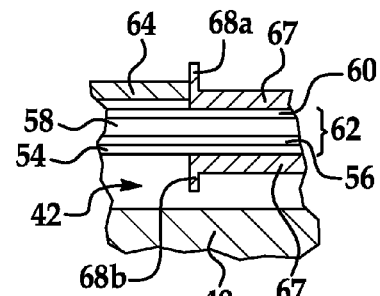
FIG. 12 is an illustration of a sectional view taken along the line 12-12 in FIG. 9.

The charge 62 having been sequentially formed and pre-aligned along the fence 48, and the blade height "H" shown in FIG. 1 having been pre-established by the axial positions of the plungers 64 (FIG. 8), a plurality of clamps 68 (FIG. 8), or other suitable clamping mechanisms, are placed in and guided along the slots 42 in the table 40 until they are brought into abutment with the plungers 64, as best seen in FIGS. 9 and 12.

Figure 14:
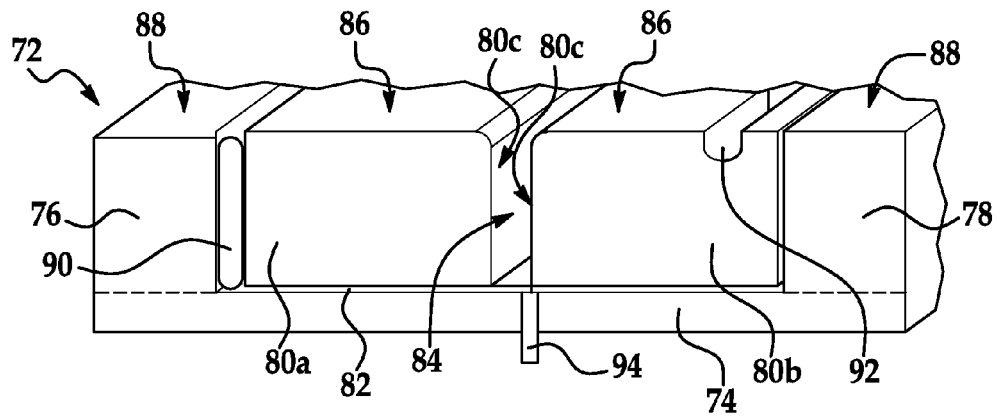
FIG. 14 is an illustration of a sectional view taken along the line 14-14 in FIG. 13.
Figure 16:
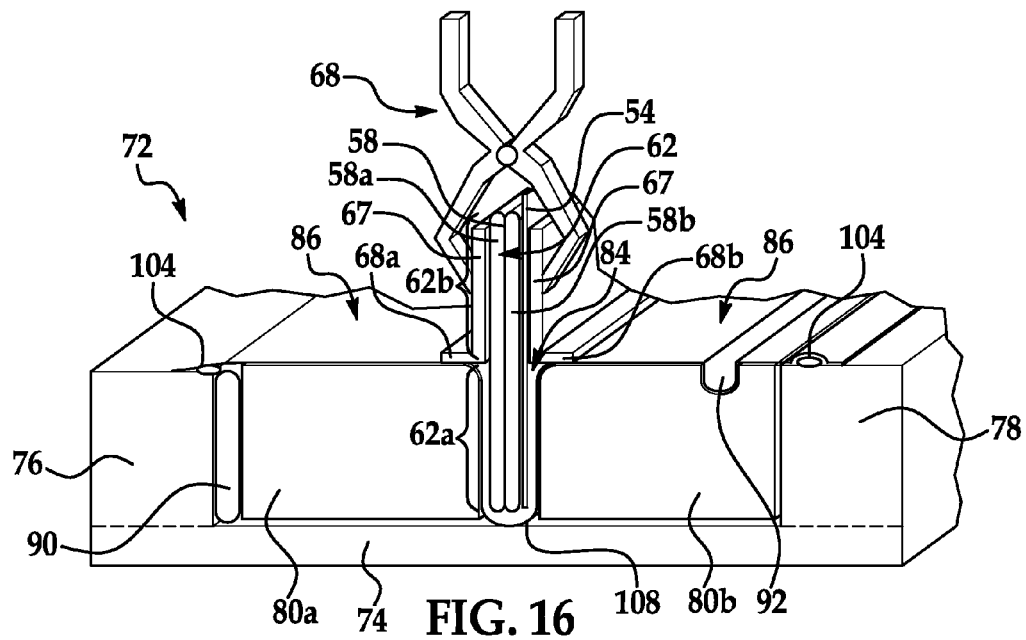
FIG. 16 is an illustration similar to FIG. 15 but showing the pre-aligned charge being placed in the forming tool, the parting films not shown for clarity.

Each of the clamps 68 may be a scissor-action or other type of "C" clamp, such as that shown in FIGS. 12, 14 and 16, having a pair of opposing jaws 67 with lateral flanges 68a, 68b respectively. As shown in FIG. 12, one of the jaws 67 of each clamp 68 is received within and slideable along one of the slots 42 beneath the charge 62, while the other jaw 67 of the clamp 68 extends over the top of the charge 62. The clamps 68 are positioned around the charge 62 and passed through the slots 42 in the table 40 shown in FIGS. 4-12 until the lateral flange 68a of one of the jaws 67 (see FIG. 12) engages the end of the plunger 64 above the charge 62. In alternate embodiments (not shown in the Figures) plungers 64 may be provided both above and below the table surface 44 (FIG. 4), in which case both lateral flanges 68a, 68b will engage and stop against one of the plungers 64. The plungers 64 therefore act as stops which determine the position of the clamps 68 on the charge 62, and particularly the location of the lateral flanges 68a, 68b, on the charge 62. Effectively, the blade height "H" established by the axial positions of the plungers 64 is transferred to the clamps 68, since the lateral flanges 68a, 68b on the jaws 67 of the clamps 68 abut the plungers 64.

Figure 10:
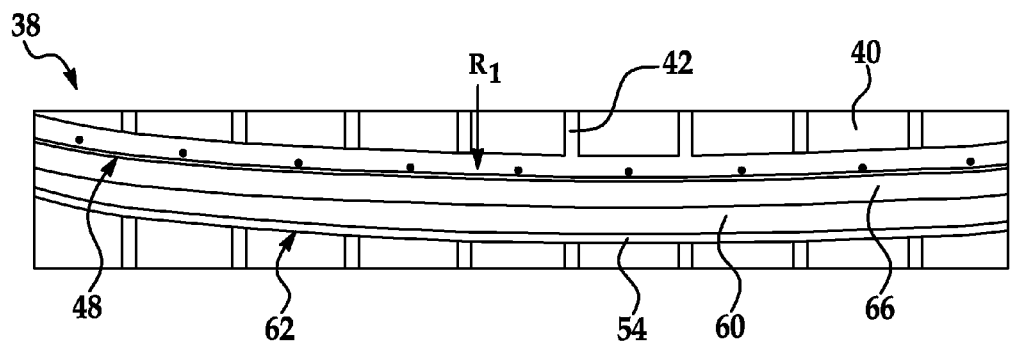
FIG. 10 is an illustration similar to FIG. 8 but showing the use of a continuous blade height spacer.

In an alternate embodiment shown in FIG. 10, the blade height "H" may be established by placing a continuous block or plate 66 on each side of the charge 62 shown in FIG. 12. The clamps 68 (FIGS. 9 and 12) are then installed on the charge 62, abutting the plate 66 to establish the blade height "H". Thus, the blade height "H" may be established by using discrete, spaced apart elements (e.g. plungers 64), or by a continuous element (e.g. the plate 66).

Figure 11:
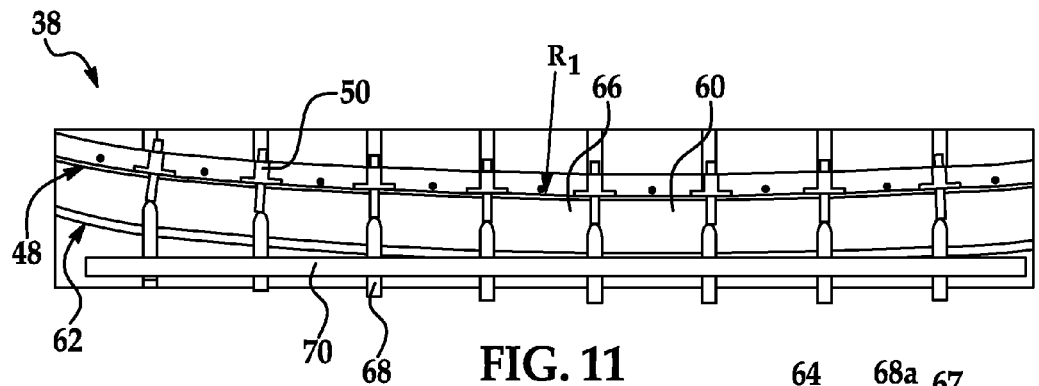
FIG. 11 is an illustration similar to FIG. 10 but showing a magnetic transfer bar having been attached to the clamps.

In an optional embodiment, shown in FIG. 11, a magnetic transfer bar 70 may be attached to the clamps 68 in order to hold and stabilize the clamped charge 62 while it is being transferred to the forming tool 72 shown in FIGS. 11-20 by the transporter 65 (FIG. 2). A variety of other means of stabilizing the clamps 68 and thus the preform assembly 62 during transfer to the forming tool 72 may be employed, such as without limitation, grips, plates, ball-lock pins, rods and fixtures (all not shown).

Figure 13:
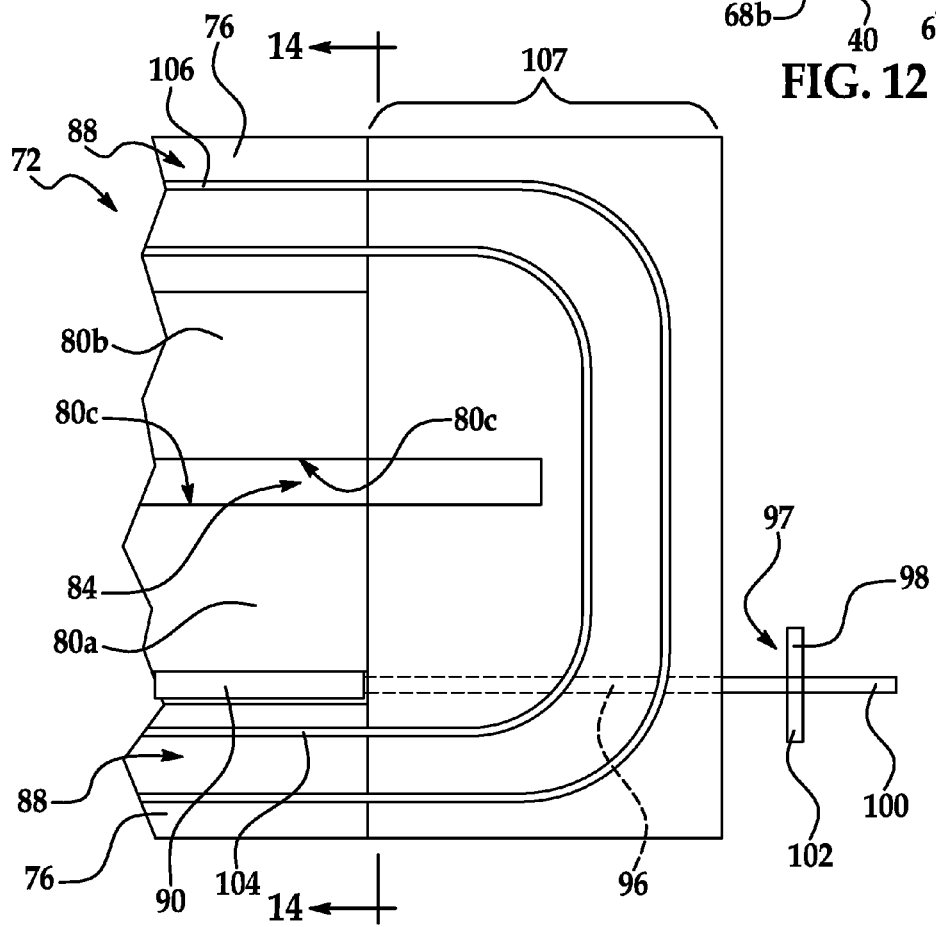
FIG. 13 is an illustration of a plan view of one end of the forming tool prior to the installation of the pre-aligned charge and resin infusion components.

Referring now to FIGS. 13 and 14, in one embodiment, the forming tool 72 may be employed to form, infuse and cure the preform assembly 62 (FIG. 12) described above. Infusion may be performed using a controlled atmospheric pressure resin infusion process in order to achieve cost effective manufacture of the stringers 30. One such suitable infusion process is described in U.S. Pat. No. 7,334,782 issued Feb. 26, 2008, the entire disclosure of which is incorporated by reference herein, however, other infusion processes may be possible.

The forming tool 72 broadly comprises a pair of mandrels 80a, 80b at least one of which is slideable on a low friction slip plate 82 (FIG. 14) that is supported on a tool base 74. The tool base 74 may be contoured along its length to substantially match the first contour $R_1$ (FIG. 1) of the stringer 30. The mandrels 80a, 80b have opposing tool faces 80c that are contoured along their lengths to substantially match the second contour $R_2$ of the stringer (FIG. 1). A pair of curve blocks 76, 78 are mounted on opposite sides of and sealed to the tool base 74 having a curvature generally matching the first contour $R_1$ (FIG. 1) of the stringer 30. Alternatively, curve blocks 76, 78 and tool base 74 may be one contiguous piece either by bonding, welding or machining a pocket from a single block of material. An inflatable bladder 90 is sandwiched between curve blocks 76 and mandrel 80a.

In one embodiment, the mandrels 80a, 80b may each comprise a single piece, while in other embodiments, they may each be segmented along their length (not shown). The opposing tool faces 80c of the mandrels 80a, 80b are laterally spaced apart from each other to form a tapered slot 84 therebetween. Each of the mandrels 80a, 80b further includes an upper, generally flat tool surface 86. Mandrel 80b is provided with a longitudinally extending resin inlet groove 92 therein for purposes discussed later. The tool base 74 may include a pneumatic fitting 94 adapted to be coupled with an outer bag air regulator (not shown).

Referring particularly to FIG. 13, the end 107 of the tool 72 includes an internal pneumatic passageway 96 that couples the inflatable bladder 90 through a valve 97 to a vacuum 98, vent 100 and compressed air 102 for controlling inflation and deflation of the bladder 90. The location of later discussed inner and outer bag seals are respectively indicated at 104 and 106.

Figure 15:
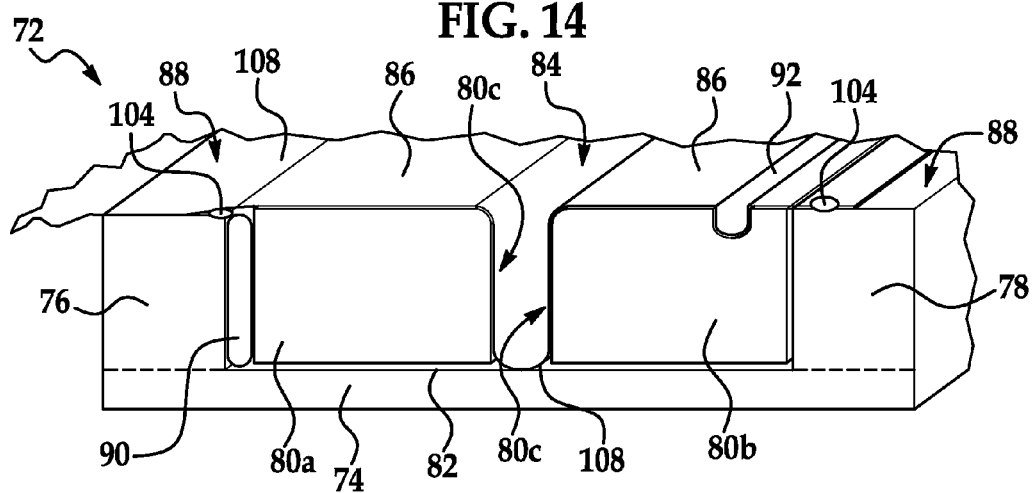
FIG. 15 is an illustration similar to FIG. 14 but showing the placement of a first vacuum bag on the forming tool.

FIG. 15 illustrates the forming tool 72 after an inner IML (inner mold line) bag 108, also referred to herein as a first bag 108, has been placed over and sealed to the tool 72 by an inner bag seals 104. The inner first bag 108 is wider than the tool 72 such that a portion 109 of the bag 108 drapes down over an edge 111 of the forming 72. As will be discussed later, inner bag portion 109 may be subsequently be folded back over the pre-form assembly 62 (not shown in FIG. 15) and sealed to the tool 72. Following placement on the tool 72, a slight vacuum may be applied through fitting 94 (FIG. 22) to the inner bag 108 in order to draw it down against the tool block surfaces 86 and into the slot 84 between the mandrels 80a, 80b. For clarity of the description below, not all areas of the inner first bag 108 are shown in FIGS. 14-19.

Following installation of the inner first vacuum bag 108, the pre-aligned preform assembly 62 is transferred from the assembly tool 38 (FIGS. 2-12) to the forming tool 72 by the transporter 65 (see FIG. 2). Referring to FIG. 16, with the bladder 90 deflated and the mandrels 80a, 80b spread to form the open slot 84, the clamped preform assembly 62 is inserted into the slot 84 between the opposing mandrel surfaces 80c. For sake of clarity, the parting films 56, 60 are not shown in either FIG. 16, or 17 discussed below. The position of the clamps 68 on the preform assembly 62, and particularly the location of the flanges 68a, 68b, define a web portion 62a corresponding to the web portion 32 (FIG. 1) of the stringer 30, and a flange portion 62b corresponding to the flange portion 34 of the stringer 30. The flanges 68a, 68b are brought into engagement with the upper mandrel surfaces 86 as the preform assembly 62 is inserted into the slot 84, thereby establishing the web height "H" shown in FIG. 1.

Figure 17:
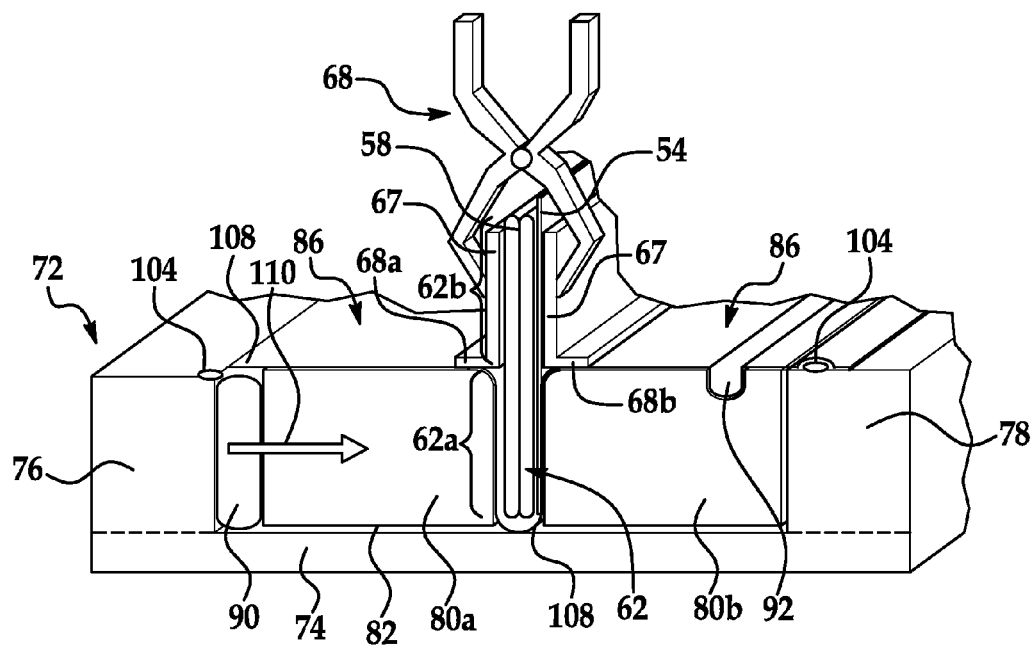
FIG. 17 is an illustration similar to FIG. 16 but showing the bladder having been inflated to clamp the web portion of the charge.

FIG. 17 illustrates the next step in the assembly process, in which the bladder 90 is inflated to apply a force in the direction shown by arrow 110, causing the mandrel 80a to slide toward the mandrel 80b, thereby clamping the web portion 62a of the preform assembly 62 between the two mandrels 80a and 80b, while the flange portion 62b of the preform assembly 62 remains held by the clamps 68. It should be noted here that while a bladder 90 has been shown in the illustrated embodiment, other means of drawing the mandrels 80a, 80b together to clamp the assembly 62 may be possible, including but not limited to motors, screws, mechanical mechanisms (all not shown).

Figure 18:
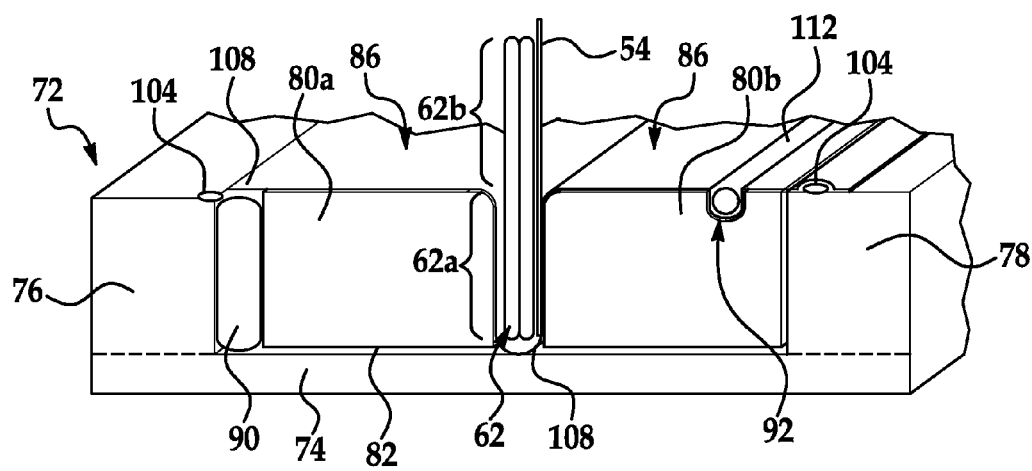
FIG. 18 is an illustration similar to FIG. 17 but showing the charge clamps having been removed and a spiral resin inlet wrap having been installed in the tool.

Referring now to FIG. 18, the next step in the assembly process involves removal of the clamps 68 from the preform assembly 62, after the web portion 62a of the assembly 62 has been clamped between the mandrels 80a, 80b, leaving the flange portion 62b of the assembly 62 exposed above the upper mandrel surfaces 86. A resin inlet spiral wrap 112 is then placed in the groove 92 and is coupled with a suitable source of resin (not shown).

Figure 19:
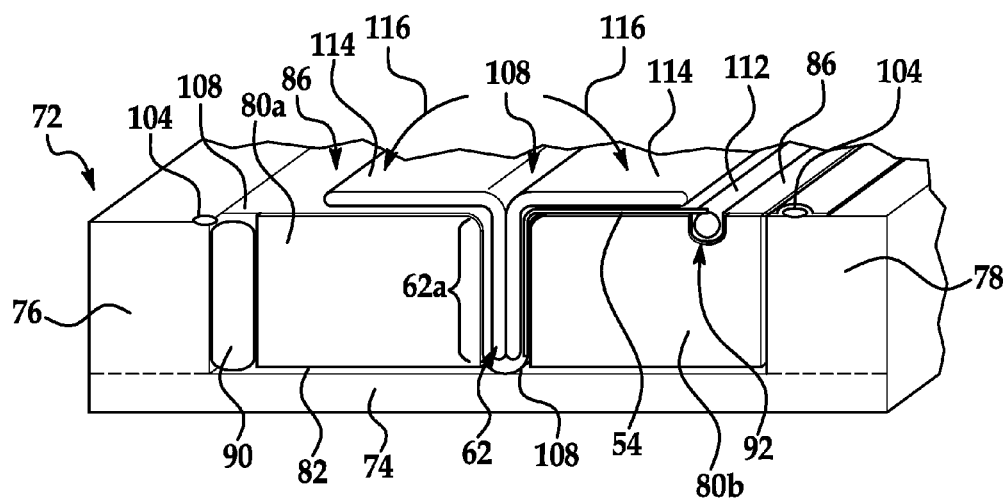
FIG. 19 is an illustration similar to FIG. 18 but showing the flange portion of the preform having been formed down onto the mandrels.

Referring to FIG. 19, the next step in the assembly process involves folding the flange portion 62b of the preform assembly 62 in the directions shown by the arrows 116, down onto the upper mandrel surfaces 86. This folding process also results in folding of the resin distribution media 54 over and into contact with the resin inlet spiral wrap 112 so that resin introduced through the spiral wrap 112 flows into the resin distribution media 54 during the subsequent infusion process. During this folding process, any fiber angle distortion of the fiber preform 58 is minimized or substantially eliminated as a result of the web portion 62a having been previously clamped and held in place while the flange portion 62b is being formed into flanges 114.

Figure 20:
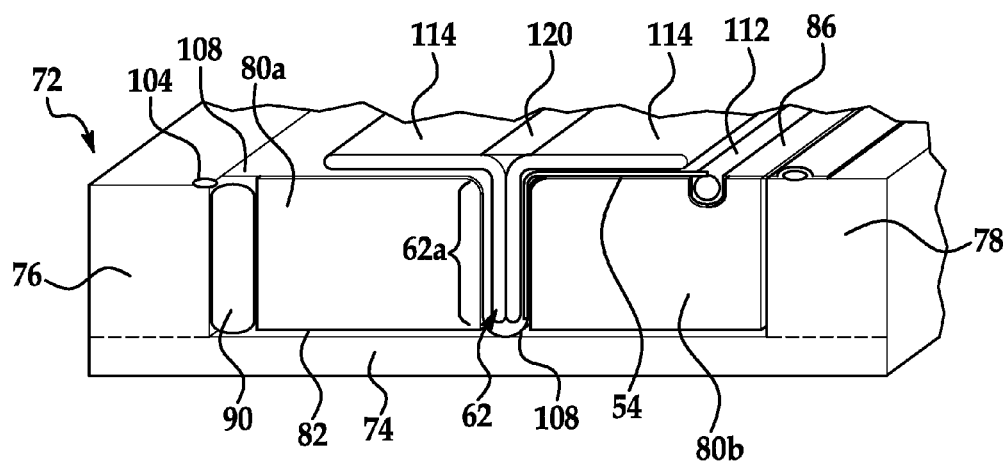
FIG. 20 is an illustration similar to FIG. 19 but showing a radius gap filler having been placed in the charge.

Clamping of the preform assembly 62 also assists in debulking the web portion 62a of the preform 58. Folding of the flanges 114 onto the upper mandrel surfaces may result in a radius gap 118 being formed at the intersection of flanges 114 and web portion 62a. In this event, as shown in FIG. 20, a suitable radius gap filler 120 may be inserted into the gap 118. In the case of an "L" shaped part, a non-stick re-usable radius filler may be used.

Figure 21:
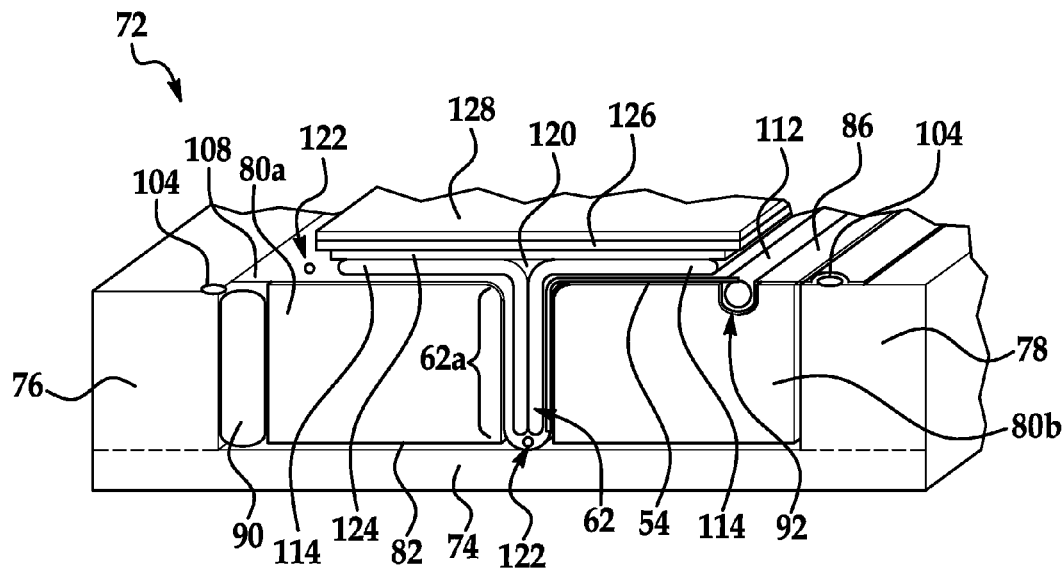
FIG. 21 is an illustration similar to FIG. 20, but showing additional components including a cap charge having been installed.

Attention is now directed to FIG. 21 which illustrates the forming tool 72 at a later, optional stage of the assembly process in those applications where the stringer 30 (FIG. 1) includes a cap 124 used to cover and reinforce the flange 34 (FIG. 1). In this stage, a fiber cap preform 124, a permeable parting film (not shown), a permeable caul plate 126 and resin distribution media 128 are sequentially stacked on top of the flanges 114. Resin exit tubes 122 are placed along the edge of the flange 114 and at the ends of the web portion 62a of the preform assembly 62. In lieu of placing two end exit tubes for the web portion of 62a, a continuous resin exit tube (not shown) may be placed into the inner bag prior to insertion of the preform charge. The exit tubes 122 allow complete evacuation of air and gases as well as excess resin to bleed away from the infused preform 58, so that substantially uniform pressure is applied to the preform 58 during curing.

Figure 22:
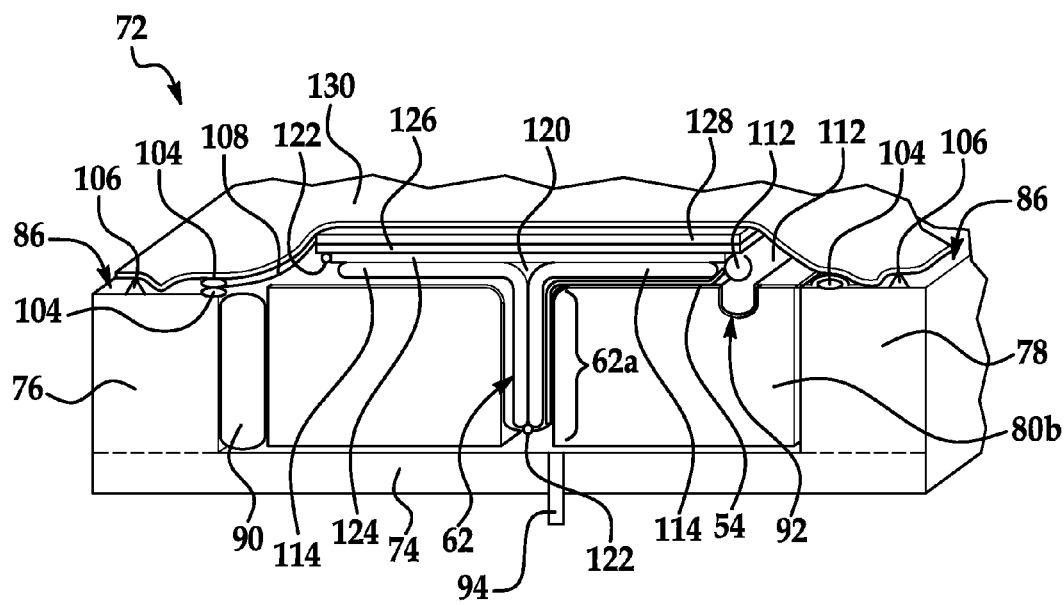
FIG. 22 is an illustration similar to FIG. 21 but showing an outer bag having been installed, sealed and evacuated.

Attention is now directed to FIG. 22 which illustrates the forming tool 72 in a further stage of the assembly process. The bag portion 109 has been folded back over the tool and sealed by the seals 104. Then, an outer second vacuum bag 130 is placed over the tool 72 covering the inner bag 108 and the preform assembly 62. The outer second vacuum bag 130 is then sealed to the forming tool 72 including the upper surfaces 86 of the curved blocks 76, 78 by outer bag seal 106. Fitting 94 may then be coupled with a suitable outer bag regulator (not shown) which regulates the vacuum applied to the outer bag 130. Air is then evacuated from the inner and outer bags 108, 130 substantially simultaneously. In one exemplary embodiment, the inner bag 108 is drawn to a slightly higher vacuum than the outer bag 130. For example, and without limitation, in one application, the inner bag 108 may be drawn to a vacuum of approximately 30 Hg while the outer bag 130 is drawn to approximately 25 Hg.

Following forming and compaction, the pressure applied to the preform assembly 62 may be adjusted, as required. In one example, the cure pressure applied to the web portion 62a (FIG. 22) is established by the pressure applied to the mandrel 80a by the bladder 90. The cure pressure applied to the flanges 114 is established by the vacuum level in the inner bag 108 and the pressure holding the flanges 114 on the mandrel surfaces 86 established by the vacuum level in the outer bag 130. After curing, the outer bag 130 is removed, following which the bladder 90 is deflated. Deflation of the bladder 90 allows the mandrels 80a, 80b to move apart, thereby unclamping the inner bag 108 and all of its contents, including the resin infused preform 58 which has become the cured stringer 30 and all associated disposable materials to be removed from the forming tool 72.

Figure 23:
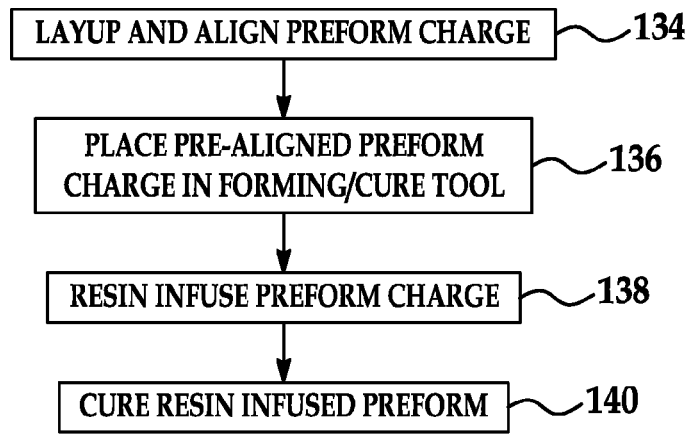
FIG. 23 is an illustration of a flow diagram of a method of making a compound contoured composite member.

Attention is now directed to FIG. 23 which illustrates a method of making a contoured composite part according to the disclosed embodiments previously discussed. Beginning at 134, a charge which may comprise a fiber preform assembly 62 is stacked up and aligned, following which, at 136, the pre-aligned preform assembly is placed in a forming tool 72. Next, at 138, the preform assembly 62 is infused with resin following which, at 140, the resin infused preform assembly 62 is cured.

Figure 24:
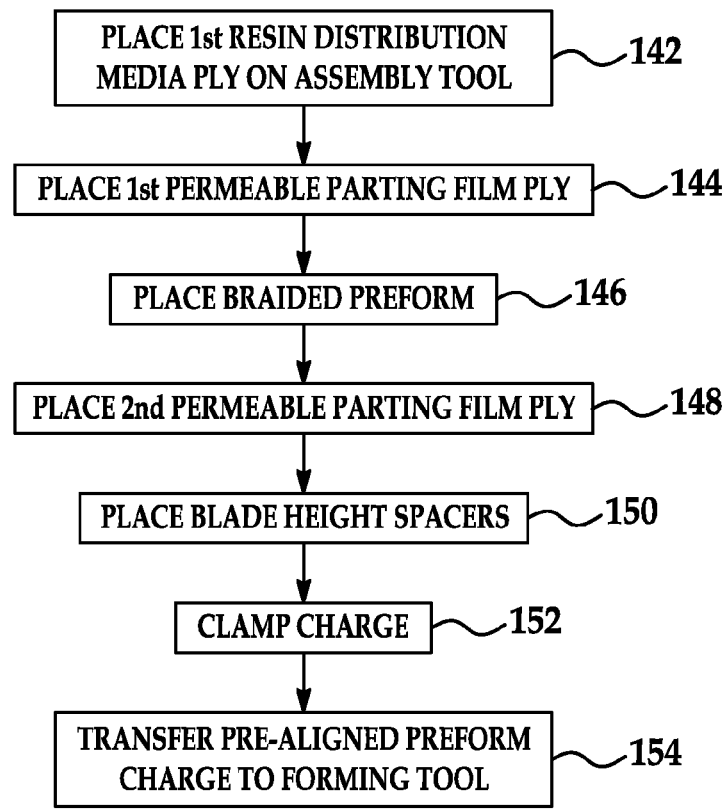
FIG. 24 is an illustration of a flow diagram showing additional steps of the method illustrated in FIG. 21.

FIG. 24 illustrates another embodiment of a method for making a composite structural member according to the disclosed embodiments. Beginning at 142, a resin distribution media ply 54 is placed on an assembly tool 38 following which at 144, a first permeable parting film ply 56 is placed over the resin distribution media ply 54. At 146, a suitable braided fiber preform 58 is placed over the first permeable parting film 56 ply following which a second permeable parting film ply 60 is placed over the preform 58, as shown at 148. At 150, one or more blade height spacers 64 or 66 are placed on the charge, and at 152, the stacked assembly 62 is clamped together to maintain ply alignment. Next, at 156, the pre-aligned preform assembly 62 is transferred to a forming tool 72 where it is resin infused and cured.

Figure 25:
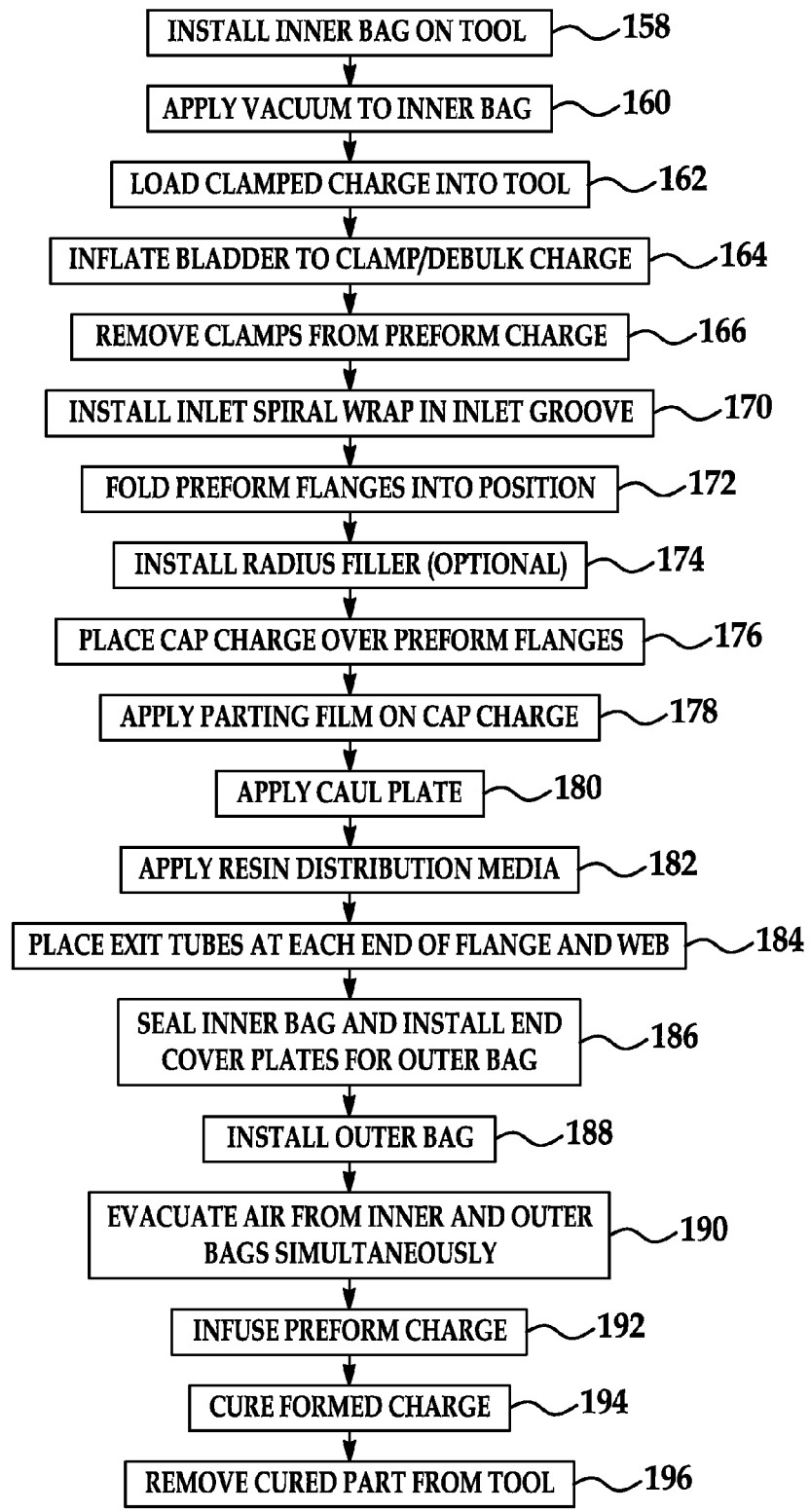
FIG. 25 is an illustration of a flow diagram of another method of making a composite structural member having compound contours.

FIG. 25 illustrates additional details of a method of making a contoured composite structural member 30 having a web 32 and at least one flange 34. Beginning at 158, an inner vacuum bag 108 is installed on a forming tool 72 following which, at 162 a vacuum is applied to the inner bag 108 to draw it down onto the forming tool 72. At 161 an exit spiral wrap 122 is placed in the bottom of the vacuum bag groove. Next, at 162, a clamped preform assembly or charge 62 is loaded onto the forming tool 72, and at 164, a bladder 90 is inflated which clamps and debulks the preform assembly 62. At 166, the assembly 62 is unclamped, and at 170, an inlet spiral wrap 112 is installed in an resin inlet groove 92 in the tool 72 as shown at 170.

Next, at 172, flanges 114 of the preform assembly are folded into position, following which at 174, a radius filler 120 may be optionally installed into a gap 118 which may be present between the flanges 114. At 176, a cap charge 124 is applied over the preform flanges 114. At 178, a permeable parting film 124 is applied over the cap charge 124 and at 180, a permeable caul plate 126 is applied over the permeable parting film. At 182, a resin distribution media 128 applied over the caul plate 126, and at 184, resin exit tubes 122 are placed at each end of the flanges 114 and the web portion 62a of the charge 62. At 186, the inner bag 108 is sealed as shown at 186. At 188, an outer bag 130 is installed over the preform charge assembly 62 and sealed to the assembly tool 72. At 190, air is evacuated from the inner and outer bags substantially simultaneously, and the preform charge assembly 62 is then infused with resin at 192. Next, at 194, the infused charge 62 is cured and at 196 it is removed from the forming tool 72, trimmed as necessary and cut to the desired lengths.

It may be appreciated that since the inner bag 108 covers the tool 72 during both the assembly and curing stages, the tool 72 may remain substantially free of resin or other residue and may require minimal or no cleaning in preparation for processing of the next part. It may also be appreciated that the inner bag 108 completely envelopes the part and associated disposable materials, thus simplifying transfer to a non clean room type area for trim.

Figure 26:
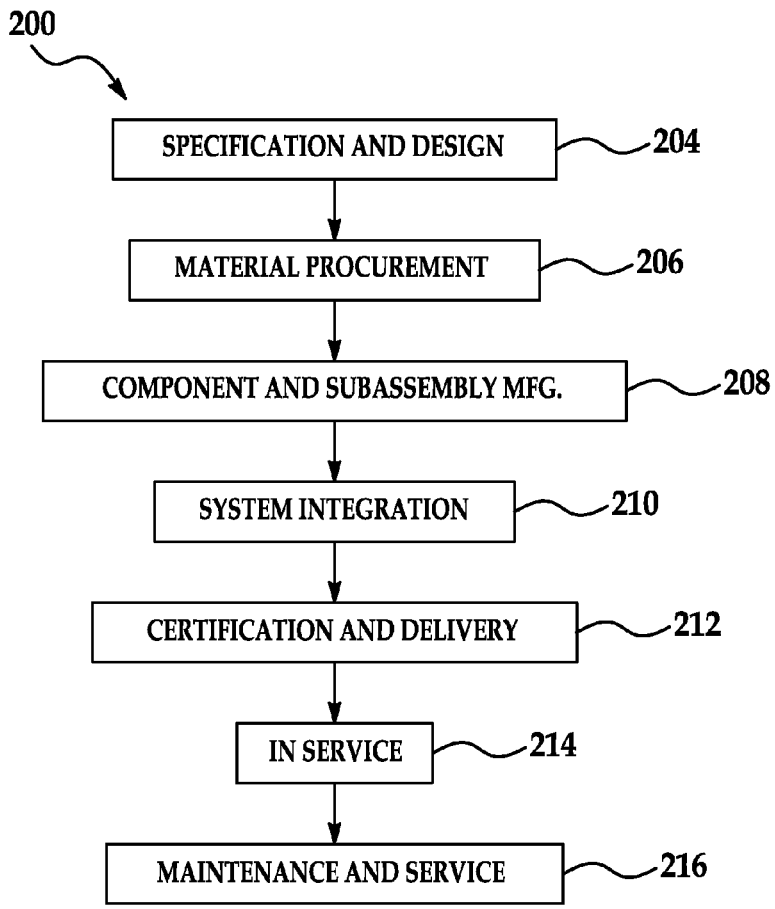
FIG. 26 is an illustration of a flow diagram of aircraft production and service methodology.
Figure 27:
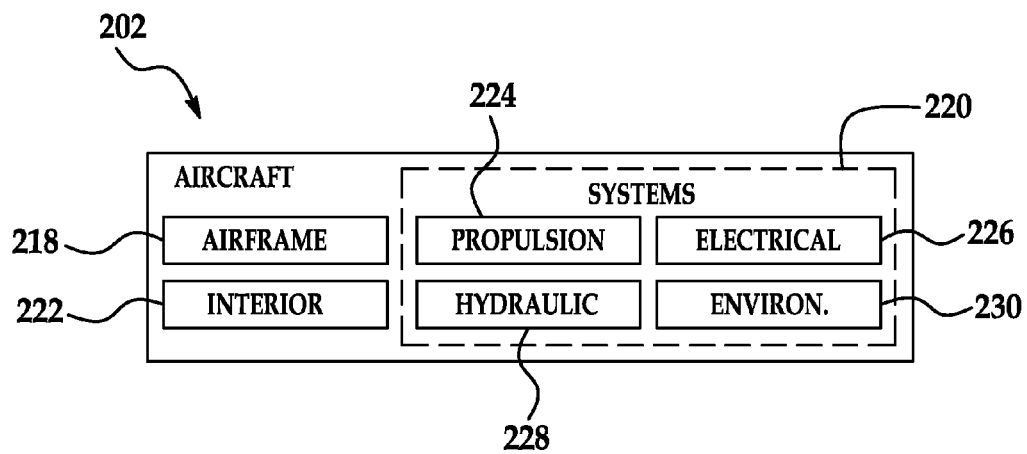
FIG. 27 is an illustration of a block diagram of an aircraft.

Referring next to FIGS. 26 and 27, embodiments of the disclosure may be used in the context of an aircraft manufacturing and service method 200 as shown in FIG. 26 and an aircraft 202 as shown in FIG. 27. During pre-production, exemplary method 200 may include specification and design 204 of the aircraft 202 and material procurement 98. During production, component and subassembly manufacturing 208 and system integration 210 of the aircraft 202 takes place. During step 208, the disclosed method and apparatus may be employed to fabricate composite parts such as stiffeners which are then assembled at step 210. Thereafter, the aircraft 200 may go through certification and delivery 212 in order to be placed in service 214. While in service by a customer, the aircraft 202 may be scheduled for routine maintenance and service 108 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 202 produced by exemplary method 200 may include an airframe 218 with a plurality of systems 220 and an interior 222. The disclosed method and apparatus may be employed to fabricate stiffeners such as stringers which form part of the airframe 110. Examples of high-level systems 220 include one or more of a propulsion system 224, an electrical system 226, a hydraulic system 228 and an environmental system 230. Any number of other systems may be included. Although an aerospace example is shown, the principles of the invention may be applied to other industries, such as the automotive industry.

The apparatus embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments may be utilized during the production stages 208 and 210, for example, by substantially expediting assembly of or reducing the cost of an aircraft 202. Similarly, one or more apparatus embodiments may be utilized while the aircraft 202 is in service, for example and without limitation, to maintenance and service 216.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of making a compound contoured composite blade stringer for aircraft, comprising:

placing a resin distribution media on an assembly tool;

placing a preform on the assembly tool covering the resin distribution media to form a preform charge;

aligning the resin distribution media and the preform charge relative to each other and along an alignment guide having a first contour;

placing a blade height spacer over the preform charge;

clamping a flange portion of the charge to maintain the alignment of the charge, including using the blade height spacer to control placement of clamps on the charge, to form a clamped charge;

installing an inner vacuum bag over a forming tool;

applying a first vacuum to a forming tool side of the inner vacuum bag transferring the clamped charge to the forming tool;

clamping a web portion of the charge in the forming tool, including inflating a bladder and using the inflation of the bladder to move a pair of mandrels into clamping engagement with the charge;

removing the clamps from the flange portion of the charge while the web portion of the charge is clamped between the mandrels;

forming a formed charge including a pair of stringer flanges by folding the flange portion of the charge down onto the mandrels;

folding the inner vacuum bag back over the formed charge;

placing an outer vacuum bag over the inner vacuum bag covering the formed charge;

sealing the inner and outer bags;

applying second and third vacuums respectively to the inner vacuum bag and the outer vacuum bag;

infusing the preform with resin by introducing resin into the inner vacuum bag to form a resin infused fiber preform;

curing the resin infused fiber preform on the forming tool to form a cured stringer; and removing the cured stringer from the forming tool following curing.

* * * * *